No. 700,622. Patented May 20, 1902.
H. N. COVELL.
CLUTCH OPERATING MECHANISM.
(Application filed Dec. 3, 1900.)
(No Model.)

Witnesses
C. W. Smith.
H. L. Reynolds.

Inventor
Harry N. Covell.
By his Attorneys
Giffin & Bull.

UNITED STATES PATENT OFFICE.

HARRY N. COVELL, OF BROOKLYN, NEW YORK.

CLUTCH-OPERATING MECHANISM.

SPECIFICATION forming part of Letters Patent No. 700,622, dated May 20, 1902.

Application filed December 3, 1900. Serial No. 38,403. (No model.)

*To all whom it may concern:*

Be it known that I, HARRY N. COVELL, a citizen of the United States, and a resident of New York city, borough of Brooklyn, in the county of Kings and State of New York, have invented a new and Improved Clutch-Operating Mechanism, of which the following is a full, clear, and exact description.

My invention relates to an improvement in mechanism for operating friction-clutches of that type in which a loose and fixed member are mounted upon a shaft and provided with friction-engaging surfaces which are brought into and thrown out of action by movement of the movable member lengthwise the shaft.

My invention comprises the novel features which are hereinafter described, and particularly pointed out in the claims.

Reference is to be had to the accompanying drawings, forming a part of this specification, in which similar characters of reference indicate corresponding parts in both the figures.

Figure 2:
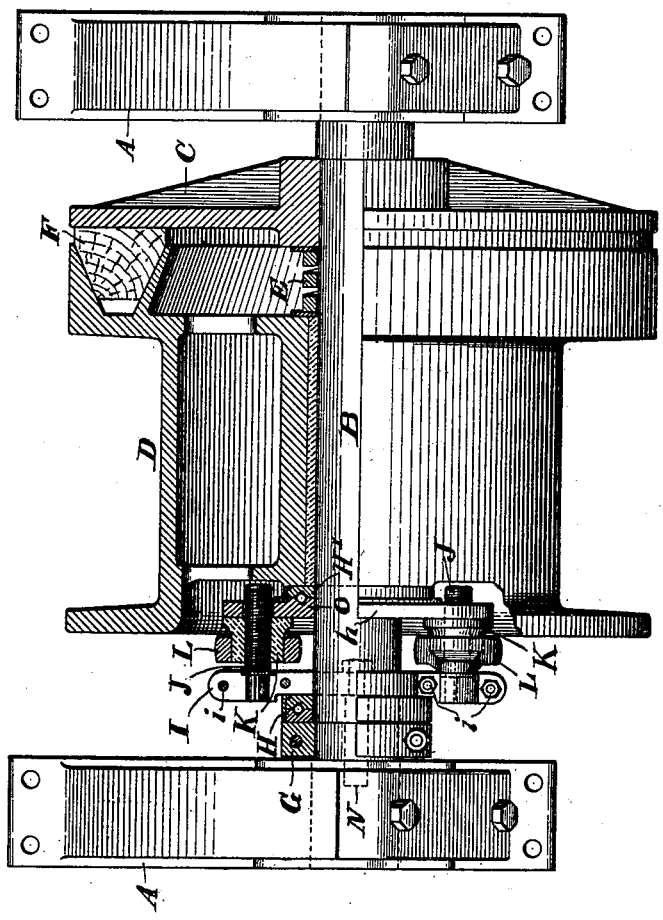
Figure 1:
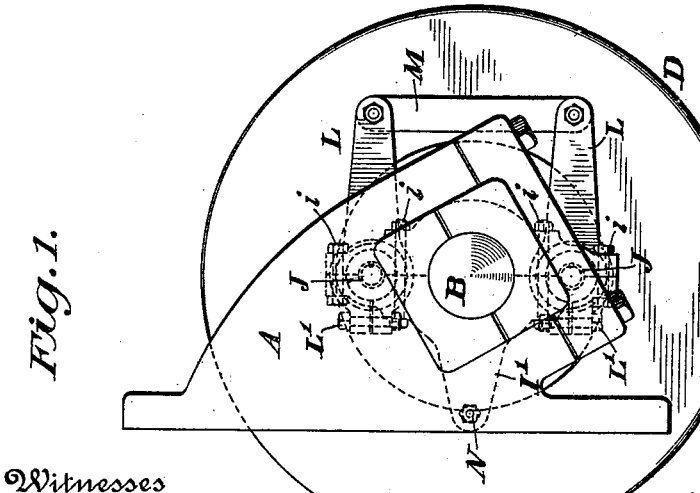

Figure 1 is an end view of my device as applied to a friction winding-drum, and Fig. 2 is a partial section and plan of the same.

One of the objects sought to be accomplished in my invention is to provide a simple and efficient device which may be operated to throw the drum into and out of engagement with the friction driving member and which shall remove all thrust or strain lengthwise of the shaft from the shaft-bearings. I have herein illustrated my invention as applied to the drum of an ordinary hoisting-engine, although it is evident that the same mechanism may be applied to the operation of any form of friction-driven mechanism.

In the drawings, A represents the frame or the member in which the shaft B is journaled. The shaft B, which in this case represents the shaft of a winding-drum, has a disk-shaped member C fixedly secured thereto and provided with annular friction-blocks F. The drum D has in one end a groove which receives the friction-blocks. The drum is mounted loosely upon the shaft—that is, so that it may rotate thereon and be moved lengthwise the shaft. Between the fixed clutch member C and the loose clutch member, which herein consists of the drum D, is placed a spring E, which serves to hold the drum disengaged from the fixed member C when not acted upon by the mechanism used for applying the friction. Upon the shaft beyond the opposite end of the drum is placed a collar G, which for convenience of application is formed in two parts secured together by bolts. This ring fits within a slight recess or groove formed in the periphery of the shaft, the object being to form a shoulder to more securely resist the pressure thereon lengthwise the shaft. This collar forms an abutment to receive the end thrust of the mechanism by which the friction is applied.

About the shaft between the abutment-collar G and the adjacent end of the drum D are placed two disks or collars, one of these, I, being formed in two parts secured together by means of the bolts $i$. The other collar or disk, O, forms one member of a thrust-bearing which consists of the two plates O and H', the two plates being each provided with a circular groove adapted to form a ball-race and within which balls are placed to form a ball-bearing.

Between the collar or disk I and the abutment-collar G is placed a corresponding ball-bearing consisting of the two plates H, similarly provided with ball-races and balls thereon.

To the collar or disk I are secured two screws J, so that they will not turn in the collar. I have herein shown these screws as provided with keys to prevent their turning; but any device which will secure this purpose will answer as well. Upon the threaded ends of these screws which project toward the drum are secured nuts K, one upon each screw. The outer face of each of these nuts bears upon the adjacent face of the disk or collar O, which forms one-half of the ball-thrust bearing lying between the same and the drum. To each of the nuts K is secured a lever L, which is preferably clamped thereon by means of a bolt L', which passes through the short split end of the lever. These two levers are connected by means of a link M or other suitable device, so that they may both be moved in unison.

It is now evident that if the nuts K be turned in one direction they will force the drum against the friction-blocks F, and thus cause the drum to rotate. If the nuts be turned in the opposite direction, they will permit the spring E to throw the drum back or away from the friction-blocks, and thus permit the drum to stop or to be rotated backward. As the friction-blocks wear so that the movement of the nuts is insufficient to cause a sufficiently hard engagement with the friction-blocks, the levers L may be loosened and adjusted to a different position upon the nuts, thus making it possible to adjust the nuts toward the drum to accommodate the wear of the friction mechanism. The pitch of the threads on the screws J may be made whatever is necessary to secure the proper movement of the drum during the swing of the levers L through the arc which is attainable.

The rotation of the collar or disk I is prevented by means of a pin N, which is secured in an extension or arm I' and enters a recess in the frame or otherwise is made to engage with a fixed member.

When it is desired to remove the friction-blocks F, this may be readily done by removing the bolts $i$ from the collar I and then removing said collar from the shaft. This enables the drum to be moved to the left, as shown in Fig. 2, a sufficient distance to make it possible to remove the blocks F and replace them with new blocks. The portions of the disk or collar O against which the ends of the nuts engage are provided with holes adapted to permit the free passage of the screws J, so that a considerable adjustment of the nuts upon the screws may be obtained. It will be seen that this construction provides for taking up all the strains due to the application of the friction mechanism within the shaft itself without in any way affecting the bearings of the shaft or making it necessary to provide a thrust-bearing between the shaft and its journal.

It is evident that many of the parts herein illustrated might be somewhat changed in construction without altering the principle of the device, and I do not, therefore, wish to be limited to the exact construction herein shown.

Having thus fully described my invention, I claim as new and desire to secure by Letters Patent—

1. In a clutch mechanism the combination with a shaft and fixed and movable clutch members mounted thereon, of an abutment-collar fixed to the shaft, a loose collar between the abutment-collar and the movable clutch member, a screw supported by said loose collar, a nut upon the screw, means for causing the relative rotation of nut and screw, and a thrust-bearing between nut and movable clutch member.

2. In a clutch mechanism the combination with a shaft and fixed and movable clutch members on the shaft, of an abutment fixed to the shaft, a clutch-operating screw outside of and non-rotatable with the shaft, a nut for said screw, means for causing relative rotation of nut and screw, and thrust-bearings transmitting the thrust of said screw and nut respectively to the abutment and movable clutch member.

3. In a clutch mechanism the combination with a shaft and fixed and movable clutch members mounted thereon, of an abutment-collar fixed to the shaft, a loose collar between the abutment-collar and the movable clutch member, a screw supported against rotation by said loose collar, a nut upon the screw, means for turning said nut and a thrust-bearing between nut and movable clutch member.

4. In a clutch mechanism the combination with a shaft, a fixed and a movable clutch member carried by said shaft, and an abutment-collar secured to the shaft, of a non-rotating collar on the shaft between the abutment-collar and the movable clutch member, screws and nuts carried by said non-rotating collar and thrust-bearings transmitting the pressure of said screws and nuts respectively to the abutment-collar and to the movable clutch member, and means for causing relative rotation of screws and nuts.

5. In a clutch mechanism the combination with a shaft, and fixed and movable clutch members on the shaft, of an abutment-collar secured to the shaft, a non-rotatable collar about the shaft between the abutment-collar and the movable clutch member, screws supported against rotation by said non-rotating collar, nuts upon the screws, thrust-bearings transmitting the pressure of nuts and screws respectively to the movable clutch member and the abutment-collar, and means adjustably secured to said nuts to turn them.

6. In a hoisting-engine, the combination with a power-driven shaft, a drum loosely mounted thereon, a clutch member fixed to the shaft, and means for frictionally engaging said clutch member with the drum to drive it, of an exterior abutment upon the shaft, nuts and screws exterior of and having a fixed position relative to the shaft, and substantially parallel with the shaft, means for causing relative rotation of nuts and screws, said nuts and screws having thrust-bearings respectively upon the drum and shaft-abutment.

7. In a clutch mechanism the combination with a shaft, and fixed and movable clutch members on the shaft, of an abutment-collar secured to the shaft, a loose collar about the shaft between the abutment-collar and the movable clutch member, said loose collar having a pin engaging the shaft-support or other fixed member to prevent turning of the collar, threaded pins or screws supported against turning by said loose collar, nuts on said screws, operating-levers adjustably secured to said nuts to turn them, and thrust-bearings interposed respectively between the loose collar and abutment and between the nuts and removable clutch member.

8. In a hoisting-engine the combination with a power-driven shaft, a drum loose thereon, and a friction driving connection between shaft and drum operated by movement of the drum lengthwise the shaft, of an abutment-collar secured to the shaft, a collar loosely surrounding the shaft between the abutment-collar and the drum, a pin connecting said loose collar and the shaft-support to prevent rotation of the collar, screws carried by the abutment-collar and extending lengthwise the shaft, nuts on said screws, thrust-bearings respectively between the loose abutment-collars and between the nuts and drum, and levers clamped upon the nuts whereby they may be turned to operate the friction mechanism.

9. In a hoisting-engine the combination with a power-driven shaft, a drum loose thereon, and a friction driving connection between shaft and drum operated by movement of the drum lengthwise the shaft, of an abutment-collar secured to the shaft, two loose and non-rotating collars upon the shaft between the drum and the abutment-collar, threaded pins carried by one of said loose collars and freely passing through the other, nuts upon said pins engaging said other loose collar, thrust-bearings between said collars and the abutment-collar and drum respectively, and levers secured to said nuts to turn them, and to thereby separate the loose collars.

10. In a clutch mechanism the combination with a shaft, of fixed and movable clutch members mounted on said shaft, a support or abutment rotating with said shaft and adjacent said movable clutch member, a non-rotating collar on said shaft between said movable clutch member and said support or abutment, said collar being split or separable to permit its removal from said shaft, and to thereby allow movement of the movable clutch member on said shaft and separation of said clutch members, and a screw-nut outside of the shaft periphery and adapted when given relative rotation to exert pressure between said abutment and the movable clutch member to operate the clutch, and means for rotating said screw.

HARRY N. COVELL.

Witnesses:
JNO. V. BEEKMAN,
H. B. GLATHE.